United States Patent Office 3,458,563
Patented July 29, 1969

3,458,563
[[3 - (HYDROCARBYLPOLYTHIO)ALKANOYL]PHE-NOXY]ALKANOIC ACIDS AND [[3-(HYDROCAR-BYLPOLYTHIO)ALKANOYL]PHENYLTHIO]ALKANOIC ACIDS
Edward J. Cragoe, Jr., Lansdale, Pa., assignor to Merck & Co., Inc., Rahway, N.J., a corporation of New Jersey
No Drawing. Filed Mar. 31, 1965, Ser. No. 444,451
Int. Cl. C07c 149/40, 149/34
U.S. Cl. 260—516                    18 Claims

ABSTRACT OF THE DISCLOSURE

[[3-(hydrocarbylpolythio)alkanoyl]phenoxy and phenylthio]alkanoic acid products wherein the hydrocarbyl moiety is an alkyl or aralkyl radical and in which the benzene ring of the phenoxy or phenylthio moiety may be substituted by halogen, trifluoromethylalkyl or an hydrocarbylene chain. The compounds are diuretic and saluretic agents which can be used in the treatment of conditions associated with electrolyte and fluid retention and hypertension.

The products are prepared by treating a suitable [(2-alkylidinealkanoyl)phenoxy or phenylthio]alkanoic acid or an ester or amide derivative thereof with an appropriate hydrocarbyl hydrodisulfide or hydrocarbyl hydrotrisulfide.

---

This invention relates to a new class of chemical compounds which can be described generally as [[3-(hydrocarbylpolythio)alkanoyl]phenoxy]alkanoic acids and [[3 - (hydrocarbylpolythioalkanoyl]phenylthio]alkanoic acids and to the nontoxic, pharmacologically acceptable, acid addition salts, esters and amide derivatives thereof.

Pharmacological studies show that the products of the invention are effective diuretic and saluretic agents which can be used in the treatment of conditions associated with electrolyte and fluid retention. When administered in therapeutic dosages, in conventional vehicles, the instant products effectively reduce the concentration of sodium and chloride ions in the body, lower dangerous excesses of fluid levels as acceptable limits and, in general, alleviate conditions usually associated with edema.

The [[3-(hydrocarbylpolythio)alkanoyl]phenoxy]alkanoic acids and [[3-(hydrocarbylpolythio)alkanoyl]phenylthio]alkanoic acids of the invention are compounds having the following structural formula:

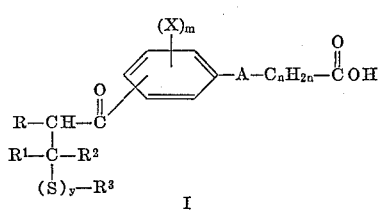

wherein A is a member selected from the group consisting of oxygen and sulfur; R is a member selected from the group consisting of hydrogen, alkyl, for example, lower alkyl such as methyl, ethyl, propyl, isopropyl, butyl, pentyl, etc., haloalkyl, for example, trihalomethyl substituted lower alkyl such as 2,2,2-trifluoroethyl, 2,2,2-trifluoroisopropyl, etc., cycloalkyl, for example, mononuclear cycloalkyl containing from three to six nuclear carbon atoms such as cyclopropyl, cyclobutyl, cyclopentyl, cyclohexyl, etc., and aryl, for example, mononuclear aryl such as phenyl which may be nuclear unsubstituted or substituted by one to four of the same or different nuclear substituents selected from the group consisting of halogen, lower alkyl, trifluoromethyl and lower alkylsulfonyl; $R^1$ and $R^2$ represent similar or dissimilar substituents selected from the group consisting of hydrogen and lower alkyl; $R^3$ is a member selected from the group consisting of alkyl, for example, lower alkyl, such as methyl, ethyl, propyl, isopropyl, isobutyl, etc., aryl, aralkyl, for example, mononuclear aryl and mononuclear aralkyl such as phenyl and phenyl-lower alkyl radicals, respectively, which may be nuclear unsubstituted or substituted by one to four of the same or different nuclear substituents selected from the group consisting of halogen, lower alkyl, for example, methyl, ethyl, etc., and lower alkoxy, for example, methoxy, ethoxy, etc., diarylmethyl, for example, mononuclear diarylmethyl such as diphenylmethyl, etc., and cycloalkyl, for example, cyclopentyl, cyclohexyl, etc.; $y$ is an integer having a value of 2–3; the X radicals represent similar or dissimilar substituents selected from the group consisting of hydrogen, halogen, trifluoromethyl, alkyl, for example, lower alkyl, alkoxy, for example, lower alkoxy and, when substituted on adjacent carbon atoms of the benzene ring, two X radicals may be joined together to form an hydrocarbylene chain (i.e., a divalent organic radical composed solely of carbon and hydrogen) containing four carbon atoms between its points of attachment, for example, tetramethylene, 1,3-butadienylene (i.e., $$-CH=CH-CH=CH-)$$

etc.; $m$ is an integer having a value of 1–4 and $n$ is an integer having a value of 1–5; and the nontoxic, pharmacologically acceptable, acid addition salts of the said compounds which may be prepared by treating the acids (I) with a suitable base. In general, any base which will react with the foregoing [[3-(hydrocarbylpolythio)alkanoyl]phenoxy]alkanoic acids and [[3-(hydrocarbylpolythio)alkanoyl]phenylthio]alkanoic acids (I) and whose pharmacological properties will not cause an adverse physiological effect when ingested by the body system is considered as being within the scope of this invention; suitable bases include, for example, the alkali metal and alkaline earth metal hydroxides, carbonates, etc., ammonia, primary, secondary and tertiary amines such as monoalkylamines, dialkylamines, trialkylamines, etc., nitrogen containing heterocyclic amines, for example, piperidine, etc.

A preferred embodiment of the invention relates to the [4 - [2.- (hydrocarbylpolythiomethyl)alkanoyl]phenoxy]alkanoic acids having the following general structural formula:

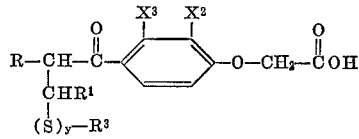

wherein R is lower alkyl; $R^1$ is a member selected from the group consisting of hydrogen and methyl; $R^3$ is a member selected from the group consisting of lower alkyl, phenyl, mononuclear substituted phenyl, benzyl and mononuclear substituted benzyl, wherein the nuclear substituent in the said phenyl and benzyl groups is a member selected from the group consisting of halogen and lower alkyl; $X^2$ and $X^3$ represent similar or dissimilar substituents selected from the group consisting of hydrogen, halogen, lower alkyl and, taken together, the $X^2$ and $X^3$ radicals may be joined to form a 1,3-butadienylene chain and $y$ is an integer having a value of 2–3. The above class of compounds exhibits particularly good diuretic and saluretic activity and represents a preferred subgroup of compounds within the scope of this invention.

The products of the invention are conveniently prepared from the [(2-alkylidenealkanoyl)phenoxy]- and [(2-alkylidenealkanoyl)phenylthio]alkanoic acids (IIa, infra) or from the corresponding ester or amide derivatives thereof, by treating the said acids, esters or amides with an hydrocarbyl hydrodisulfide or hydrocarbyl hydrotrisulfide. Preferably, the reaction is conducted in an inert atmosphere, as in nitrogen, but it will be appreciated by those skilled in the art that the use of an inert atmosphere is not critical to the success of the process. Also, the reaction may be conducted in the presence of any solvent which is reasonably inert with respect to the reactants employed as, for example, in water. Also, when it is desired to obtain the alkanoic acids products per se, it is most advantageous to conduct the synthesis in the presence of a basic reagent such as sodium bicarbonate, followed by the treatment of the intermediate sodium salt thus formed with an acid to obtain the free [[2-(hydrocarbyldi(or tri) thiomethyl)alkanoyl]phenoxy]alkanoic acid or [[2-(hydrocarbyldi(or tri)thiomethyl)alkanoyl]phenylthio]alkanoic acid. The following equation illustrates the process:

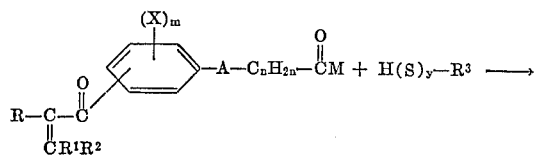

IIa

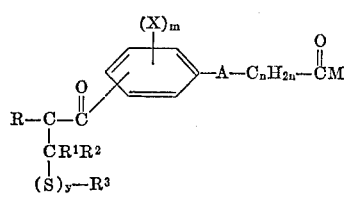

Ia wherein A, R, $R^1$, $R^2$, $R^3$, X, $y$, $m$ and $n$ are as defined above and M is hydroxyl, an alkoxy radical such as methoxy, ethoxy, propoxy, etc., or an amino radical such as an amino, or a monoalkylamino or dialkylamino radical, for example, methylamino, ethylamino, dimethylamino, diethylamino, etc.

The [[2-(hydrocarbylpolythiomethyl)alkanoyl]phenoxy]alkanoic acids of the invention and their phenylthio analogs may also be prepared by the reaction of a [[2-(di-substituted-aminomethyl)alkanoyl]phenoxy(or phenylthio)]alkanoic acid (V, infra), or by the reaction of an acid addition salt (IV, infra) or quaternary ammonium derivative (VI, infra) thereof, with a suitable hydrocarbyl substituted hydrodisulfide or hydrotrisulfide, preferably, in the presence of an aqueous solution of a base such as sodium bicarbonate. When a base is used, the intermediate salt thus obtained is then treated with acid such as hydrochloric acid, to obtain the desired [[3-(hydrocarbyldi-(or tri)thio)alkanoyl]phenoxy]alkanoic acid or [[3-(hydrocarbyldi(or tri)thio)alkanoyl]phenylthio]alkanoic acid product. Alternatively, in lieu of employing an alkanoic acid starting material (V) in the reaction with the polysulfide, the corresponding ester or amide derivative may be used to obtain the appropriate ester or amide product.

The products of the invention are usually obtained in solid form and, if desired, may be purified by recrystallization from a suitable solvent.

The [(2-alkylidenealkanoyl)phenoxy]alkanoic acids and [(2-alkylidenealalkanoyl)phenylthio]alkanoic acids (II) which are the starting materials in the foregoing preparative method are primarily prepared by one of several routes, the choice of which depends largely upon the character of the alkylidene group in the said starting materials. The following two paragraphs relate solely to the preparation of those 2-alkylidene derivatives which are [(2-methylenealkanoyl)phenoxy]alkanoic acids and [(2-methylenealkanoyl)phenylthio]alkanoic acids and also, to the preparation of the [[2-(disubstituted-aminomethyl) alkanoyl]phenoxy(and phenylthio)]alkanoic acids (V) and to the corresponding acid addition salts (IV) and quaternary ammonium derivatives (VI) thereof; which amines and quaternary ammonium derivatives are also intermediates in the preparation of the said 2-methylene substituted compounds (II).

The said [(2-methylenealkanoyl)phenoxy(and phenylthio)]alkanoic acids (II), [[2-(disubstituted-aminomethyl)alkanoyl]phenoxy(and phenylthio)]alkanoic acids (V) and the corresponding acid addition salts (IV) thereof are synthesized by the reaction of an (alkanoylphenoxy)alkanoic acid or (alkanoylphenylthio)alkanoic acid (III, infra) with formaldehyde or paraformaldehyde and the acid addition salt of a secondary amine as, for example, the acid addition salt of a dialkylamine, piperidine or morpholine, to yield the corresponding acid addition salt of [[2 - (disubstituted-aminomethyl)alkanoyl]phenoxy(or phenylthio)]alkanoic acid (IV). The acid addition salt of the Mannich amine (IV) thus obtained may then be isolated by conventional means and employed as the starting material in the foregoing reaction with an hydrocarbyl hydrodisulfide or hydrotrisulfide or, alternatively, the Mannich amine salt (IV) may be converted to the corresponding [(2-methylenealkanoyl)phenoxy]- or [(2-methylenealkanoyl)phenylthio]alkanoic acid (II) by decomposition as, for example, by heating the said Mannich amine salt (IV) to temperatures above room temperature in the presence of a solvent of high dielectric constant, for example, in the presence of dimethylformamide. Also, according to an alternate method, the Mannich amine salt (IV) may be treated with a weak base, such as sodium bicarbonate, to obtain the corresponding free amine (V) and the secondary amino group thereof eliminated to form the corresponding [(2-methylenealkanoyl)phenoxy]- or [(2-methylenealkanoyl)phenylthio]alkanoic acid (II). In some instances, elimination of the secondary-amino group to form the [(2 - methylenealkanoyl)phenoxy]- or [(2-methylenealkanoyl)phenylthio]alkanoic acid (II) occurs at ambient temperatures but, generally, elimination is most advantageously effected by the application of heat. Alternatively, in lieu of converting the free amine salt (IV) to the methylene derivative (II), the said amine may be isolated to yield [[2-(di-substituted-aminomethyl)alkanoyl]phenoxy(or phenylthio)]alkanoic acid (V) which may be employed as the starting materials in the process of this invention. The following equation illustrates these methods of preparation:

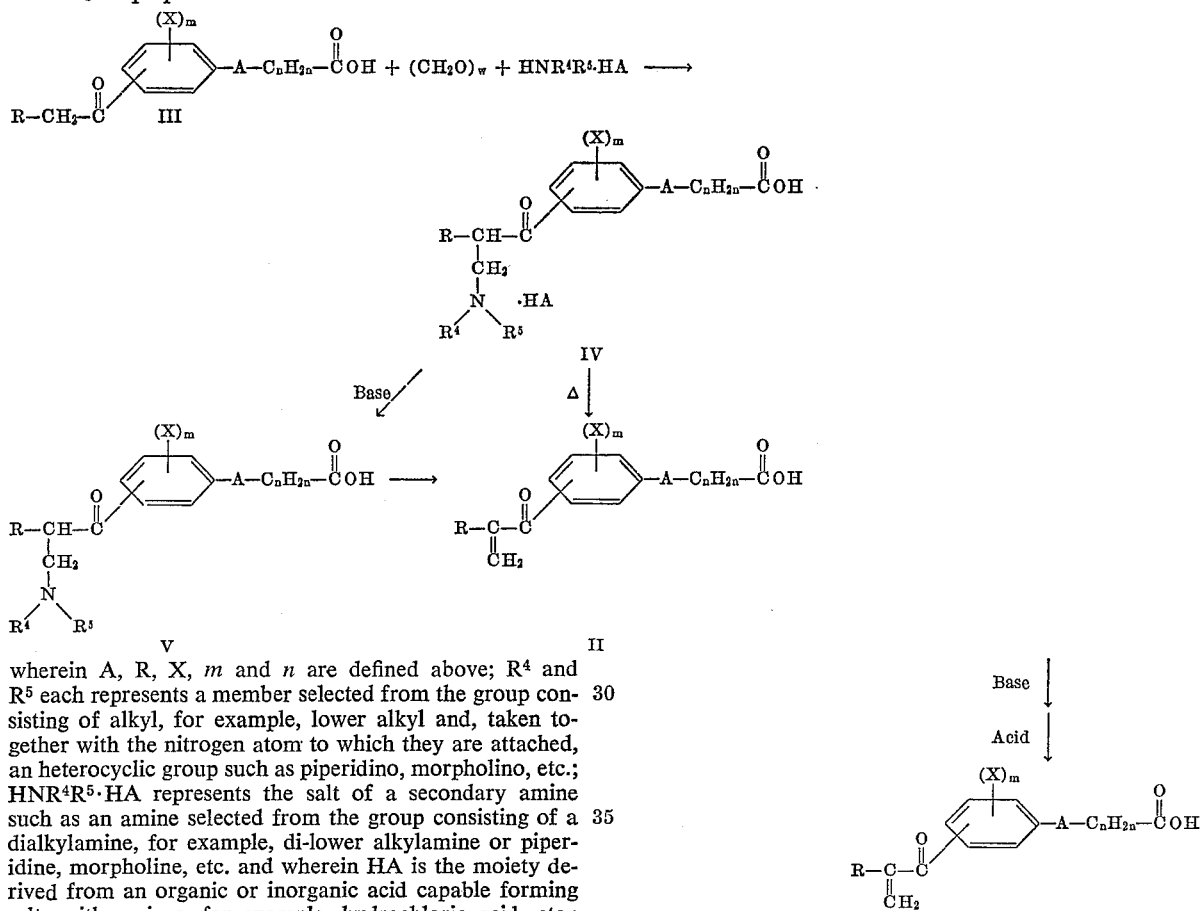

wherein A, R, X, m and n are defined above; $R^4$ and $R^5$ each represents a member selected from the group consisting of alkyl, for example, lower alkyl and, taken together with the nitrogen atom to which they are attached, an heterocyclic group such as piperidino, morpholino, etc.; $HNR^4R^5 \cdot HA$ represents the salt of a secondary amine such as an amine selected from the group consisting of a dialkylamine, for example, di-lower alkylamine or piperidine, morpholine, etc. and wherein HA is the moiety derived from an organic or inorganic acid capable forming salts with amines, for example, hydrochloric acid, etc.; and w is the integer 1 or a number greater than 1.

A modification of the foregoing process also comprises treating the Mannich amine (V) with a suitable quaternizing agent to obtain the corresponding quaternary ammonium salt (VI, infra). The said quaternary ammonium salt may then be isolated and employed as the starting material for reaction with an hydrocarbyl disulfide or trisulfide or the said quaternary salt may be converted to the desired [(2 - methylenealkanoyl)phenoxy]- or [(2 - methylenealkanoyl)phenylmercapto]alkanoic acid (II) by treatment with a base as, for example, with an aqueous solution of sodium bicarbonate, and then with a suitable acid. Suitable acids which may be used include, for example, hydrochloric acid, etc. The following equation illustrates this method of preparation:

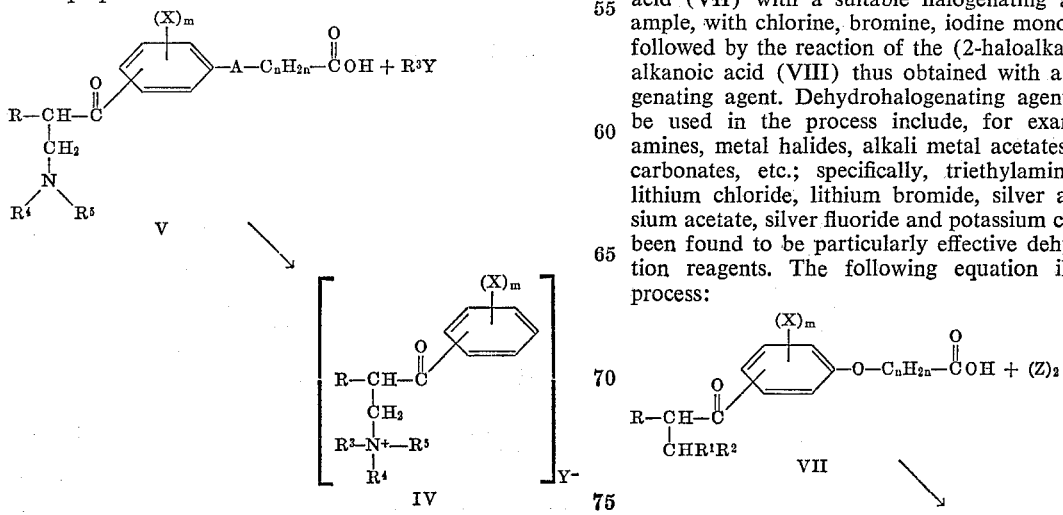

wherein A, R, $R^4$, $R^5$, X, m and n are as defined above; $R^3Y$ represents an hydrocarbyl halide, i.e., the halide derivative of a monovalent organic radical composed solely of carbon and hydrogen, for example, methyl bromide, methyl iodide, etc.; $R^3$ represents an hydrocarbyl radical, for example, lower alkyl, etc. and $Y^-$ represents the anion derived from an hydrocarbyl halide, for example, a bromide ion, an iodide ion, etc.

Another method by which the starting materials of this invention may be obtained and one which is particularly suitable for preparing those [(2-alkylidenealkanoyl) phenoxy]alkanoic acids wherein either or both of the $R^1$ and $R^2$ moieties represent a lower alkyl radical, comprises treating a suitable alkanoyl substituted phenoxyalkanoic acid (VII) with a suitable halogenating agent, for example, with chlorine, bromine, iodine monochloride, etc., followed by the reaction of the (2-haloalkanoylphenoxy) alkanoic acid (VIII) thus obtained with a dehydrohalogenating agent. Dehydrohalogenating agents which may be used in the process include, for example, tertiary amines, metal halides, alkali metal acetates, alkali metal carbonates, etc.; specifically, triethylamine, anhydrous lithium chloride, lithium bromide, silver acetate, potassium acetate, silver fluoride and potassium carbonate have been found to be particularly effective dehydrohalogenation reagents. The following equation illustrates this process:

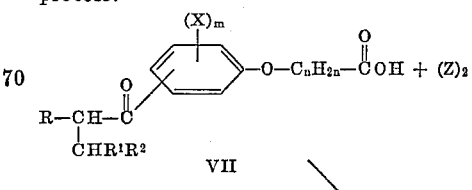

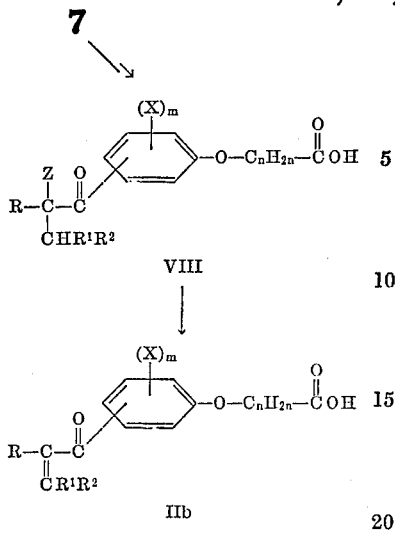

wherein R, $R^1$, $R^2$, X, $m$ and $n$ are as defined above; Z represents an halogen atom, for example, a chlorine atom, a bromine atom, an iodine atom, etc.; and $(Z)_2$ represents an halogenating agent as, for example, chlorine, bromine, iodine monochloride, etc. In general, the dehydrohalogenation reaction may be carried out in any inert solvent in which the (2-haloalkanoylphenoxy)alkanoic acid (VII) and dehydrohalogenation reactants are reasonably soluble; for example, dimethylformamide has proved to be a particularly suitable medium in which to conduct the reaction.

The [(2 - methylenealkanoyl)phenoxy]alkanoic acid (II) and the corresponding ester, amide and nitrile starting materials of the invention may also be prepared by an alternate method as, for example, by the reaction of a suitable (nuclear-hydroxy)alkanophenone derivative with formaldehyde or paraformaldehyde and the acid addition salt of a secondary amine to obtain the corresponding (nuclear-hydroxy) 2 - (secondary-aminomethyl)alkanophenone, (X, infra) (i.e., the Mannich amine salt), followed by elimination of the amino group in the Mannich amine salt (X) thus obtained by treatment with a weak base such as sodium bicarbonate and by the application of heat, to produce the corresponding (nuclear-hydroxy) -2-methylenealkanophenone derivative (XI, infra), which derivative is then treated with the alkali metal salt of an halo substituted alkanoic acid and the carboxylate intermediate thus formed acidified to form the desired [(2-methylenealkanoyl)phenoxy]-alkanoic acid. Employment of an halo substituted alkanoic acid amide, alkanoic acid ester or alkanonitrile yields the corresponding [(2-methylenealkanoyl)phenoxy]alkanamide, alkanoic acid ester or alkanonitrile. The following equation illustrates the preparation of the alkanoic acids and the corresponding ester, amide and nitrile starting materials:

wherein R, X, $m$, $n$ and $w$ are as defined above; $Z^1$ is halogen, for example, chlorine, etc. and E is carboxy, an alkoxycarbonyl radical such as methoxycarbonyl, ethoxycarbonyl, propoxycarbonyl, etc., carbamoyl, N-methylcarbamoyl, N-ethylcarbamoyl, N,N-dimethylcarbamoyl, N,N-diethylcarbamoyl, etc. and cyano.

Another method for preparing the [(2-alkylidenealkanoyl)phenoxy]alkanoic acid (IIb) starting materials of the invention and one which is particularly suitable for preparing those starting materials wherein one or both of the $R^1$ and $R^2$ moieties represents lower alkyl, comprises the reaction of a (nuclear-hydroxy)alkanophenone having the Formula XII, infra, with a suitable halogenating agent to obtain the corresponding nuclear hydroxy substituted 2-halo-alkanophenone; treating the 2-halo-alkanophenone derivative thus formed with a dehydrohalogenating agent such as triethylamine, anhydrous lithium chloride, etc., to yield the corresponding nuclear hydroxy-2-alkylidenealkanophenone intermediate (XIII, infra), then treating the intermediate thus obtained with an hydrocarbyl ester of an halo substituted alkanoic acid and hydrolyzing the resulting ester derivative to the [2-alkylidenealkanoyl)phenoxy]-alkanoic acid (IIb). Halogenating agents which may be used in the foregoing halogenation step include, for example, bromine, chlorine, iodine monochloride, etc. The following equation illustrates the reaction:

wherein R, X, Z, $Z^1$, $(Z)_2$, $m$ and $n$ are as defined above; and $R^7$ is an hydrocarbyl radical (i.e., an organic radical composed solely of carbon and hydrogen) such as lower alkyl, etc.

The [(2 - alkylidenealkanoyl)phenoxy]acetic acid reactants of the process of the invention may also be prepared by the hydrolysis of a suitable [(2-alkylidenealkanoyl)phenoxy]acetamide, or the corresponding acetic acid ester or acetonitrile derivative thereof (XIV, infra). The hyrolysis is most advantageously conducted in aqueous solution with ethanol and, preferably, in the presence of a weak base such as sodium bicarbonate. The following equation illustrates the process:

The following equation illustrates this method of preparation using an halo-alkanoic acid reactant:

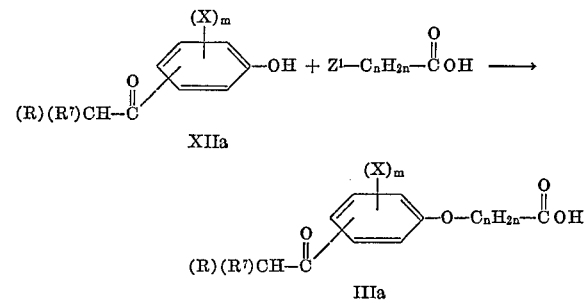

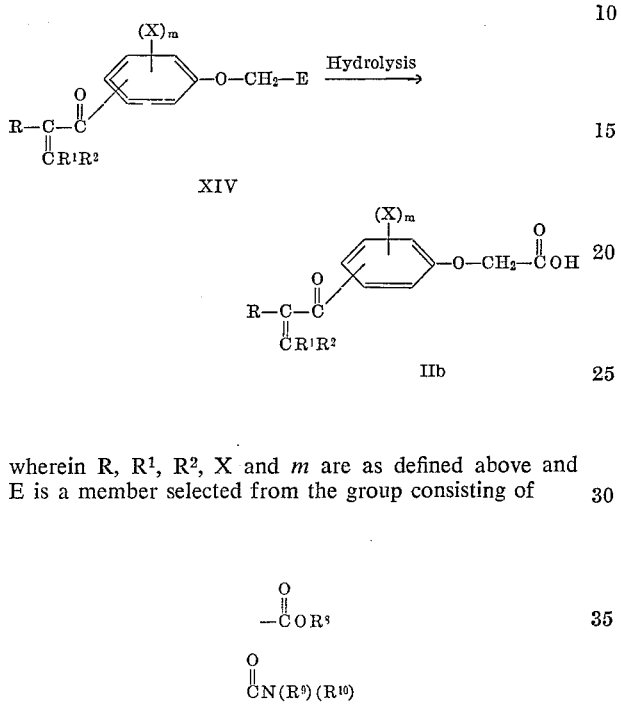

wherein R, X, $Z^1$, m and n are as defined above and $R^7$ is a member selected from the group consisting of hydrogen and an alkyl radical of the formula —$CHR^1$—$R^2$ wherein $R^1$ and $R^2$ are as defined above. Suitable bases which may be employed in the reaction include, for example, sodium hydride in glyme (i.e., sodium hydride in 1,2-dimethoxymethane), aqueous sodium hydroxide, sodium amide in benzene, sodium ethoxide in ethanol or potassium ethoxide in ethanol.

The (nuclear-hydroxy)alkanophenones (IX and XII) employed as reactants in the foregoing etherification reaction are either known compounds or may be conveniently prepared by known methods. One such method comprises treating an appropriate alkanoyl halide with aluminum chloride and a suitable nuclear substituted or nuclear unsubstituted anisole, phenetole, or other equivalent ether, in the presence of a suitable solvent, such as carbon disulfide, and converting the (nuclear-alkoxy)alkanophenone thus obtained to the corresponding (nuclear-hydroxy)alkanophenone derivative by treatment with an additional amount of aluminum chloride and with the application of heat. This method of preparation is illustrated by the following equation:

wherein R, $R^1$, $R^2$, X and m are as defined above and E is a member selected from the group consisting of $$-\overset{O}{\underset{\|}{C}}OR^8$$

$$-\overset{O}{\underset{\|}{C}}N(R^9)(R^{10})$$

and —CN, wherein $R^8$ is an hydrocarbyl radical such as lower alkyl, for example, methyl, ethyl, etc., and $R^9$ and $R^{10}$ each represent similar or dissimilar radicals selected from the group consisting of hydrogen, lower alkyl, for example, methyl, ethyl, etc. and, taken together with the nitrogen atom to which they are attached, a mononuclear heterocyclic radical such as 1-pyrrolidinyl, piperidino or morpholino.

Various methods may be used to prepare the (alkanoylphenoxy)- and (alkanoylphenylthio)alkanoic acid reactants described above as compounds III and VII. One method comprises the Friedel-Crafts reaction of an alkanoyl halide or suitably substituted alkanoyl halide with an appropriate, nuclear substituted or nuclear unsubstituted, phenoxy- or phenylthio-alkanoic acid in the presence of a metallic halide to produce the corresponding 4-(alkanoylphenoxy)alkanoic acid or 4-(alkanoylphenylthio)alkanoic acid. Anhydrous aluminum chloride and boron trifluoride are particularly effective catalysts in promoting the Friedel-Crafts reaction. The reaction proceeds most favorably in carbon disulfide or petroleum ether solvents and with slight heating as, for example, at reflux temperatures by heating on a steam bath.

The (alkanoylphenoxy)alkanoic acid reactants may also be prepared by an alternate route. According to this method a (nuclear-hydroxy)alkanophenone is allowed to react with an appropriate halo substituted alkanoic acid, or with an esterified derivative thereof, in the presence of a base to obtain the corresponding (alkanoylphenoxy) alkanoic acid, or corresponding alkanoic acid ester derivative and, when the ester derivative is obtained, hydrolyzing the said ester intermediate as, for example, with an aqueous solution of sodium hydroxide, to generate the corresponding (alkanoylphenoxy)alkanoic acid (IIIa).

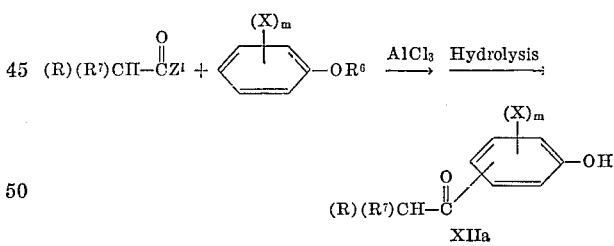

wherein R, X, $Z^1$ and m are as defined above; $R^6$ is a lower alkyl radical, for example, methyl, ethyl, etc. and $R^7$ is a member selected from the group consisting of hydrogen and an hydrocarbyl radical of the formula —$CHR^1R^2$ wherein $R^1$ and $R^2$ are as defined above.

Still another method for preparing the (nuclear-hydroxy)alkanophenones (IX and XII consists in treating an appropriate phenol with an alkanoyl halide to produce the corresponding phenol ester, followed by the heating of the said ester thus formed with aluminum chloride to effect a nuclear rearrangement which results in the formation of the desired (nuclear-hydroxy)alkanophenone. This method of preparation is particularly suitable for preparing the 2'-hydroxy-alkanophenone reactants.

Another method for preparing the (nuclear-hydroxy) alkanophenone starting materials comprises the reaction of a suitable Grignard reagent, such as (R)($R^7$)CHMgBr, wherein R and $R^7$ are as defined above, with the alkyl ether of an appropriate (formyl)phenol, followed by oxidation of the (nuclear-alkoxy)benzyl alcohol intermediate thus produced with sodium dichromate and cleavage of the ether group in the resulting (nuclear-alkoxy)alkanophenone by the treatment with aluminum chloride. The following equation illustrates this method of preparation:

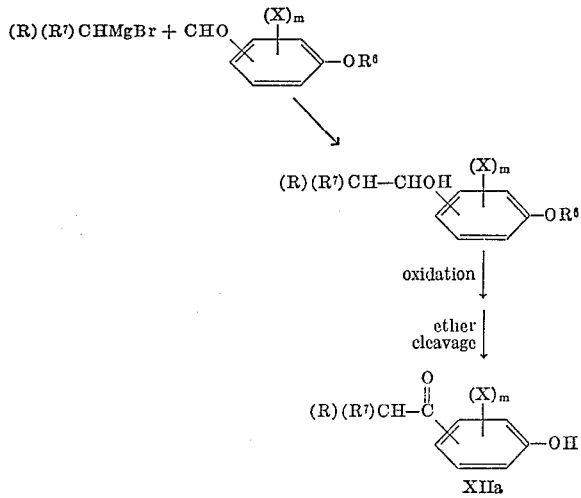

wherein R, R⁶, R⁷, X and $m$ are as defined above. The Grignard method may be used to prepare all of the isomeric (nuclear hydroxy)alkanophenone reactants, i.e., the 2'-, 3'- and 4'-hydroxy-alkanophenones, but this method of preparation is particularly advantageous for preparing the 3'-hydroxy-alkanophenone isomers. For example, a 3-formylanisole reacts with the appropriate Grignard reagent to produce the corresponding 3-methoxy-benzyl alcohol and the said alcohol may then be oxidized to the corresponding (nuclear alkoxy)alkanophenone and the methyl ether group cleaved to produce the desired (nuclear hydroxy)alkanophenone compound.

Still another method for preparing the 3'-hydroxy-alkanophenone compounds consists in first nitrating an appropriate alkanophenone by conventional means as, for example, with fuming nitric acid, to produce the corresponding 3'-nitroalkanophenone intermediate; reducing the said nitro derivative to its amine counterpart and then converting the amine derivative thus obtained in the known manner to the desired 3'-hydroxyalkanophenone derivative.

The hydrocarbyl hydrodisulfide and hydrotrisulfide compounds which are employed as starting materials in the instant process are either known products or may be prepared by known methods. The hydrodisulfides, for example, are conveniently obtained from their corresponding hydrocarbyl mercaptans by treating the said mercaptan with an acyl sulfenyl halide, such as acetyl sulfenyl chloride, in ether solution, to produce the corresponding acyl hydrocarbyl disulfide and then hydrolyzing the said acyl intermediate thus formed to the desired product. Generally, hydrolysis is most advantageously conducted by treating the acyl hydrocarbyl disulfide with an aqueous solution of an acid, such as hydrochloric acid, and in the presence of an alcohol solvent such as methanol, ethanol, etc. In a similar manner the hydrocarbyl trisulfide starting materials may also be obtained by substituting acyl disulfenyl halide, for the acyl sulfenyl halide described above in an otherwise analogous process. The following equations, wherein the acyl sulfenyl halide and acyl disulfenyl halide reactants employed are acetyl sulfenyl chloride and acetyl disulfenyl chloride, respectively, illustrate the process:

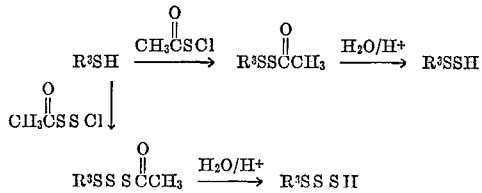

wherein R³ is as defined above and H⁺ is the cation derived from an organic or inorganic acid as, for example, hydrochloric acid, etc.

This invention also relates to the ester and amide derivatives of the products of the invention and include all such derivatives as are compatible with the body system and whose pharmacological properties will not cause an adverse physiological effect. Esters and amides which are within the scope of this invention include, for example, the alkyl esters such as the methyl, ethyl and propyl esters, etc. and the amide and mono- and dialkylamide derivatives such as the N-methyl, N-ethyl and N-propylamide derivatives, etc., the N,N-dimethylamide, N,N-diethylamide derivatives, etc.

The [[3 - (hydrocarbylpolythio)alkanoyl]phenoxy]alkanoic acids and [[3-(hydrocarbylpolythio)alkanoyl]phenylthio]alkanoic acids (I) of the invention can be administered in therapeutic dosages in conventional vehicles as, for example, by oral administration in the form of a tablet as well as by intravenous injection. The dosage of the products may be varied over a wide range and for this purpose scored tablets containing 25, 50, 100, 150, 250 and 500 milligrams of the active ingredient may be made available to the physician for the symptomatic adjustment of the dosage to the individual patient. These dosages are well below the toxic or lethal dose of the compounds.

A suitable unit dosage form of the products of this invention can be prepared by mixing 50 mg. of a [[3-(hydrocarbyldi(or tri)thio)alkanoyl]phenoxy]alkanoic acid and [[3-(hydrocarbyldi(or tri)thio)alkanoyl]phenylthio]-alkanoic acid (or a suitable acid addition salt, ester or amide derivative thereof) with 150 mg. of lactose and placing the 200 mg. of mixture into a No. 3 gelatin capsule. Similarly, by employing more of the active ingredient and less lactose other dosage forms can be put up in No. 3 gelatin capsules and, should it be necessary to mix more than 200 mg. of ingredients together, larger capsules can be imployed. Compressed tablets, pills or other desired unit dosages can be prepared to incorporate the compounds of this invention by conventional methods and, if desired, can be made up as elixirs or as injectable solutions by methods well-known to pharmacists.

It is also within the scope of this invention to combine two or more of the compounds of this invention in a unit dosage form or to combine one or more of the compounds with other known diuretics or with other desired therapeutic and/or nutritive agents in dosage unit form.

The examples which follow illustrate the [[3-(hydrocarbyldi(or tri)thio)alkanoyl]phenoxy]alkanoic acids and [[3 - (hydrocarbyldi(or tri)thio)alkanoyl]-phenylthio]alkanoic acids of the invention and the method by which they are prepared. However, the examples are illustrative only and it will be apparent to one having ordinary skill in the art that all of the products embraced by Formula I, supra, may also be prepared in an analogous manner by substituting the appropriate starting materials for those set forth in the examples.

EXAMPLE 1

[2,3-dichloro-4-[2-(benzyldithiomethyl)butyryl]phenoxy]-acetic acid

Step A: 2,3 - dichloroanisole.—A five-liter, four-neck, round-bottom flask is equipped with a stirrer, thermometer, reflux condenser and two dropping funnels. 2,3-dichlorophenol (400 g., 2.45 mole) and 10 N sodium hydroxide (245 ml., 2.45 mole) are added. The temperature rises to 55° C. The mixture is heated to 80–85° C. on a steam bath and 10 N sodium hydroxide (613 ml., 6.15 mole) is placed in one dropping funnel and dimethyl sulfate (814 ml., 1083 g., 8.58 mole) in the other. The base and dimethyl sulfate are then added simultaneously in a dropwise manner over 3½ hours with stirring. Heating and stirring are continued for one hour. The mixture then is cooled and water (2400 ml.) is added. The oil that separates soon solidifies. The solid is collected by filtration and dissolved in ether (1000 ml.). The filtrate is extracted with ether (600 ml.) and the two ether solutions are combined and dried over anhydrous sodium sulfate. The ether is evaporated and the residue is dried in a vacuum desiccator over phosphorus pentoxide. The yield is 428 g. (98%) of 2,3-dichloroanisole, M.P. 32–33° C.

Step B: 2′,3′ - dicholoro - 4′-hydroxybutyrophenone.— Butyryl chloride (128.0 g., 1.2 mole), 2,3-dichloroanisole (197.7 g., 1.11 mole) and carbon disulfide (400 ml.) are placed in a four-neck flask fitted with a mechanical stirrer, thermometer, reflux condenser (protected by a calcium chloride tube) and a Gooch sleeve bearing a 250 ml. Erlenmeyer flask containing anhydrous aluminum chloride (160 g., 1.2 mole). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for one hour, then in a water bath at 55° C. for 45 minutes and then kept at room temperature overnight.

n-Heptane (400 ml.) and aluminum chloride (160 g., 1.2 mole) then are added. The condenser is set for distillation, the mixture is stirred and heated in a water bath heated by means of a steam bath and the carbon disulfide is distilled off. A second portion of heptane (400 ml.) is added, the condenser is set for reflux, the reaction mixture is stirred and heated in a bath at 80° C. for three hours and then allowed to cool. The hexane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon (2–3 teaspoons) and filtered by suction through a pad of diatomaceous earth. Upon acidification, a light brown solid separates. This is collected by filtration, washed with water and dried at 100° C. for three hours.

The dried solid is dissolved in hot benzene (one liter) and the insoluble matter is removed by filtration. Upon cooling, a slightly colored solid separates. This is dissolved in hot benzene (750 ml.), the solution is allowed to cool to room temperature and then chilled to 10° C. in a refrigerator. The product (203 g., 85%), M.P. 109–110.5° C., is collected by filtration. The product is taken up in 1500 ml. of hot benzene, treated with decolorizing carbon and filtered. Upon cooling, a white solid identified as 2′,3′-dichloro-4′-hydroxybutyrophenone (180 g., 75%), M.P. 109–110° C., separates.

*Analysis* for $C_{10}H_{10}Cl_2O_2$. Calculated: C, 51.52; H, 4.32; Cl, 30.42. Found: C, 51.70; H, 4.24; Cl, 30.32.

Step C: Ethyl (2,3 - dichloro - 4-butyrylphenoxy)-acetate.—Dry 1,2-dimethoxyethane (100 ml.) is placed in a one-liter, four-neck, round-bottom flask equipped with a stirrer, reflux condenser (protected by a calcium chloride tube) and a dropping funnel. Sodium hydride (10.3 g. of a 53% solution in mineral oil, 0.215 mole) is added, the stirrer started and a solution of 4-butyryl-2,3-dichlorophenol (50 g., 0.215 mole) in dry 1,2-dimethoxyethane (150 ml.) is added, dropwise, over a period of 30 minutes. After the evolution of gas has ceased, ethyl bromoacetate (35.9 g., 0.215 mole) is introduced, dropwise, over 30 minutes.

The mixture is stirred and heated on a steam bath for 3.5 hours. The major portion of the 1,2-dimethoxyethane is removed by distillation, then ether (400 ml.) and sufficient water to dissolve the precipitated sodium bromide are added. The ether layer is separated, washed with water and dried over anhydrous sodium sulfate. The ether is removed by distillation and the residue is distilled in vacuo. The portion boiling at 180–195° C. at 0.5 mm. mercury pressure is collected. Upon standing, the distillate crystallizes to a white solid, M.P. 53–54° C. The yield is 64 g. (95%). Recrystallization from a 1.5 mixture of benzene and cyclohexane gives ethyl (2,3-dichloro-4-butyrylphenoxy)acetate melting at 55–46° C.

*Analysis.*—$C_{14}H_{16}Cl_2O_4$. Calculated: C, 52.68; H, 5.05; Cl. 22.22. Found: C, 52.79; H, 5.03; Cl, 22.07.

Step D: (2,3-dichloro-4-butyrylphenoxy)acetic acid.— Ethyl (2,3-dichloro-4-butyrylphenoxy)acetate (30 g., 0.095 mole) is dissolved in methanol (100 ml.) and is treated with a solution of 85% potassium hydroxide (13.2 g., 0.2 mole) in methanol (100 ml.). The mixture is stirred for an hour and then the methanol is removed by distillation at reduced pressure. The residue is dissolved in hot water and the solution cooled and acidified with hydrochloric acid. The solid that separates is (2,3-dichloro-4-butyrylphenoxy)acetic acid. The yield is 26 g. (95%) of material which after recrystallization from a 1:3.6 mixture of benzene and cylohexane, melts at 110.5–111.5° C. (A dimorphic form melting at 100–101° C. is sometimes isolated.)

*Analysis.*—$C_{12}H_{12}Cl_2O_4$. Calculated: C, 49.51; H. 4.15; Cl, 24.36. Found: C, 49.81; H, 4.22; Cl, 24.40.

Step E: [2,3-dichloro - 4 - [2 - (dimethylaminoethyl)-butyryl]phenoxy]acetic acid hydrochloride.—In a 100 ml. round flask equipped with an outlet tube suitable for connecting to a water aspirator is placed an intimate mixture of (2,3-dichloro-4-butylphenoxy)acetic acid (5.20 g., 0.0179 mole), paraformaldehyde (0.63 g., 0.072 mole), dry dimethylamine hydrochloride (1.59 g., 0.0195 mole) and four drops acetic acid. The mixture is heated on the steam bath for about 1.5 hours and during this period the internal pressure of the vessel is reduced to about 15 mm. mercury for a period of one minute at 15-minute intervals. Upon cooling, a solid is obtained which is triturated with ether to give 5.8 g. (85%) of [2,3-dichloro-4-[2-(dimethylaminomethyl)butyryl]phenoxy]acetic acid hydrochloride in the form of a white solid. After two recrystallizations carried out by dissolving the solid in hot methanol and gradually adding ether, the product melts at 165–167° C.

*Analysis.*—$C_{15}H_{20}OCl_3NO_4$. Calculated: C, 46.83; H, 5.24; Cl, 27.65; N, 3.64. Found: C, 46.69; H, 5.31; Cl, 27.59; N, 3.53.

Step F: [2,3-dichloro-4-(2-methylenebutyryl)phenoxy]-acetic acid.

The [2,3 - dichloro - 4 - [2 - (dimethylaminomethyl) butyryl]-phenoxy]acetic acid hydrochloride, obtained as described in Step E, is dissolved in 25 ml. of water and the solution made slightly basic by the addition of 10% sodium bicarbonate solution. The resulting solution is heated for about 25 minutes on a steam bath, cooled and acidified with 6 N hydrochloric acid to give [2,3-dichloro-4-(2-methylenebutyryl)phenoxy]acetic acid, M.P. 115–118° C. Two recrystallizations from a mixture of benzene and cyclohexane give [2,3-dichloro-4-(2-methylenebutyryl)-phenoxy]acetic acid in the form of a white solid material melting at 124–125° C.

*Analysis.*—$C_{13}H_{12}Cl_2O_4$. Calculated: C. 51.51; H, 3.99; Cl, 23.39. Found: C, 51.23; H, 4.18; Cl, 23.49.

Step G: [2,3 - dichloro - 4 - [2 - (benzyldithiomethyl)-butyryl]phenoxy]acetic acid.—To a solution of [2,3-dichloro-4-(2-methylenebutyryl)-phenoxy]acetic acid (3.0 g., 0.0099 mole) in oxygen-free water (50 ml.) containing sodium bicarbonate (0.832 g., 0.0099 mole), is added benzyl hydrodisulfide (1.68 g., 0.0108 mole). While the mixture is stirred at room temperature for two hours in an atmosphere of nitrogen, a white solid separates. The solid is separated by filtration, suspended in water and made acid to Congo red test paper by the addition of 6N hydrochloric acid. The product is extracted with ether, the combined extracts dried over anhydrous magnesium sulfate and the ether evaporated under reduced pressure to give 3.62 g. (79%) of white [2,3-dichloro-4-[2-(benzyldithiomethyl)butyryl]-phenoxy]acetic acid, M.P. 104–109° C. Recrystallization from butyl chloride gives [2,3-dichloro- 4 - [2 - (benzyldithiomethyl)butyryl]phenoxy]acetic acid melting at 114–116° C.

*Analysis.*—$C_{20}H_{20}Cl_2O_4S_2$. Calculated: C, 52.29; H, 4.39; S, 13.96. Found: C, 51.84; H, 4.58; S, 13.43.

In a manner similar to that described in Example 1, the product [2,3-dichloro-4-[2-(benzyltrithiomethyl)-butyryl]phenoxy]acetic acid is obtained by substituting benzyl hydrodisulfide for the benzyl hydrodisulfide reactant of Example 1, Step G, and following substantially the procedure described therein.

EXAMPLE 2

[2,3-dichloro-4-[2-(benzyldithiomethyl)butyryl]phenoxy]acetamide

Step A: 2-dimethylaminomethyl - 2',3' - dichloro-4'-hydroxybutyrophenone hydrochloride.—2',3'-dichloro-4'-hydroxybutyrophenone, obtained in Example 1, Step B (46.62 g., 0.2 mole), paraformaldehyde (12.01 g., 0.4 mole), dimethylamine hydrochloride (32.62 g., 0.4 mole), concentrated hydrochloric acid (1.0 ml.) and absolute ethanol (46 ml.) are combined and heated under reflux, protected from moisture, for three hours.

After standing overnight at room temperature, the reaction solution is concentrated under reduced pressure to a viscous oil. The residual oil is triurated with water (150 ml.) and filtered to remove a white solid which is shown to be starting phenol (29% recovered). The aqueous filtrate is extracted with ether and then concentrated to dryness under reduced pressure to give 62.3 g. of 2 - dimethylaminomethyl - 2',3' - dichloro - 4'-hydroxybutyrophenone hydrochloride, a white solid, M.P. 130–150° C.

Two recrystallizations from absolute ethanol give 27.3 g. (42%) of 2-dimethylaminomethyl - 2',3' - dichloro - 4'-hydroxybutyrophenone hydrochloride, melting at 156–159° C.

*Analysis.*—$C_{13}H_{17}Cl_2NO_2 \cdot HCl$. Calculated: C, 47.80; H, 5.55; N, 4.29. Found: C, 47.77; H, 5.55; N, 4.25.

Step B: 2-methylene-2',3'-dichloro-4'-hydroxy-butyrophenone.—2 - dimethylaminomethyl-2',3',-dichloro - 4'-hydroxy-butyprophenone hydrochloride (1.0 g., 0.00306 mole) is dissolved in water (25 ml.) and the solution made basic by the addition of saturated sodium bicarbonate solution. The colorless solution is heated on a steam bath (80–90° C.) for 30 minutes, cooled and made acid to Congo red test paper by the addition of 6 N hydrochloric acid. The resulting semisolid is extracted with ether and the combined extracts are dried over anhydrous magnesium sulfate. The ether is evaporated under reduced pressure to give 0.65 g. (87%) of a white solid, M.P. 82–84° C.

Two recrystallizations from hexane give white prisms of 2-methylene-2',3'-dichloro-4'-hydroxybutyrophenone, melting at 84–85° C.

*Analysis.*—$C_{11}H_{10}Cl_2$. Calculated: C, 53.90; H, 4.11; Cl, 28.93. Found: C, 53.78; H, 3.96; Cl, 29.03.

Step C: [2,3 - dichloro - 4 - (2 - methylenebutyryl)-phenoxyacetamide.—2 - methylene-2',3'-dichloro-4'-hydroxybutylrophenone (19.6 g., 0.08 mole) is dissolved in absolute ethanol (50 ml.) and treated with a solution of sodium (1.84 g., 0.08 mole) dissolved in ethanol (200 ml.). 2-bromoacetamide (12.1 g., 0.088 mole) is added and the mixture stirred and refluxed in an atmosphere of dry nitrogen for 1.25 hours.

The ethanol is removed by distillation at reduced pressure to give [2,3-dichloro-4-(2-methylenebutyryl)-phenoxy]acetamide which, after recrystallization from benzene, melts at 152–153° C.

*Analysis.*—$C_{13}H_{13}Cl_2NO_3$. Calculated: C, 51.67; H, 4.34; Cl, 23.47; N, 4.64. Found: C, 51.24; H, 4.28; Cl, 23.32; N, 4.55.

Step D: [2,3-dichloro-4-[2-(benzyldithiomethyl)-butyryl]phenoxy]acetamide.—In a nitrogen atmosphere [2,3-dichloro-4-(2-methylenebutyryl)phenoxy]acetamide (3 g., 0.01 mole) is dissolved in warm ethanol and benzyl hydrodisulfide (1.68 g., 0.0108 mole) is added. The solution is kept at 50° C. for 24 hours and then refrigerated overnight. The product, [2,3-dichloro-4-[2-(benzyldithiomethyl)butyryl]phenoxy]-acetamide, which is obtained by evaporation of the solvent can be purified by recrystallization.

EXAMPLE 3

[3-chloro-4-[2-(methyldithiomethyl)butyryl]phenoxy]-acetic acid

Step A: 3-chloroanisole.—A three-liter, four-neck flask is fitted with a mechanical stirrer, reflux condenser, thermometer and two graduated dropping funnels. The flask is charged with 10 N sodium hydroxide (200 ml., 2 mole), methanol (400 ml.) and m-chlorophenol (257 g., 2 mole). The flask is fitted with a steam bath, the stirrer is started and the steam regulated so that a gentle reflux is maintained throughout the reaction period. The initial recation temperature is 55–60° C.; at the end of the reaction it is 75–80° C.

One dropping funnel is charged with dimethyl sulfate (652 ml., 880 g., 6.98 mole) and the other with 10 N sodium hydroxide (500 ml., 5 mole). The two solutions are added simultaneously to the reaction mixture taking care that the mixture remains alkaline throughout the reaction period. The addition requires 2.5 hours.

After refluxing for an additional hour, the mixture is cooled and poured into cold water (2 liters). The upper, organic phase is separated in a separatory funnel and the aqueous phase thrice extracted with 400 ml. portions of ether. The combined ether and organic phases are dried over anhydrous sodium sulfate.

The ether is removed by distillation and the residue fractionated at reduced presure using a still with a 30-inch column. The fraction boiling at 65–67° C/7–8 mm. (78–80° C./15 mm. or 81–83° C./18–20 mm.) is collected. The yield varies from 263 g. (92%) to 281 g. (99%) of 3-chloroanisole.

Step B: 2'-chloro-4'-methoxybutyrophenone.—A two-liter resin flask is fitted with a mechanical stirrer, thermometer, reflux condenser capped with a calcium chloride drying tube and an Erlenmeyer flask attached via Gooch tubing. The apparatus is oven-dried and assembled while hot. The system is flushed with dry nitrogen and petroleum ether (750 ml.) (which had previously been dried overnight over some anhydrous aluminum chloride) is placed in the flask. m-Chloroanisole (213.9 g., 1.5 mole) and butyryl chloride (191.8 g., 1.8 mole) are added and the stirrer started. Anhydrous aluminum chloride (200 g., 1.5 mole) is placed in the Erlenmeyer flask and added, portionwise, to the reaction mixture over 30 minutes.

The reaction mixture gradually changes from a pale yellow color to dark orange. Finally a red oil begins to separate. After the addition is complete, stirring is continued for another two hours. Throughout the entire period of reaction, there is a vigorous evolution of hydrogen chloride. During the reaction, the temperature does not exceed 30° C.

The reaction mixture now consists of two layers. The upper, petroleum ether layer is decanted off and discarded. The viscous bottom layer is poured into a mixture of crushed ice (1 kg.) and concentrated hydrochloric acid (450 ml.).

After the ice has melted, the oil is separated from the aqueous phase and the latter thrice extracted with 500 ml. portions of ether. The combined organic and ether extracts are washed, first with 150 ml. of 5% hydrochloric acid, then twice with 150 ml. portions of water and finally dried over anhydrous sodium sulfate. The ether is removed by distillation and the residue distilled at reduced pressure using a still with a 30-inch column.

The fraction boiling at 100–110° C./0.1 mm. (122–138° C./1.5–2.9 mm.) is collected. The yield is 298 g. (94%) of product consisting of a mixture of 2'-chloro-4'-methoxybutyrophenone and 2'-methoxy-4'-chlorobutyrophenone in about equal portions. Separation at this stage is difficult to obtain by the usual techniques. However, the corresponding phenols are easily separated, therefore the mixture is used for the final step.

Step C: 2'-chloro-4'-hydroxybutyrophenone.—A two-liter resin flask is equipped and assembled as described for the above reaction. n-Heptane (1500 ml.) is dried overnight over anhydrous aluminum chloride and placed in the reaction vessel with the mixture of 2'-chloro-4'-methoxybutyrophenone and 2'-methoxy-4'-chlorobutyrophenone prepared in Step B (298.6 g., 1.4 mole). The stirrer is started and the aluminum chloride (373.4 g., 2.8 mole) is added over a period of 15 minutes. The temperature rises from 20° C. to 55° C.

The reaction mixture is refluxed for three hours using a steam bath as a heat source. There is a vigorous evolution of hydrogen chloride during this period and a viscous brown glass separates. Stirring becomes more difficult as the reaction progresses and may even have to be terminated. The reaction mixture is cooled to room temperature and the upper, heptane phase decanted off. The residue is treated with a mixture of crushed ice (1 kg.) and concentrated hydrochloric acid (600 ml.). (A considerable amount of stirring and scraping is required to cause the aluminum complex to decompose.)

The mixture containing a yellow solid is thrice extracted with 500 ml. portions of ether. The combined ether extracts are washed with two 250 ml. portions of water and dried over anhydrous sodium sulfate. The ether is removed by distillation and the residue fractionated. The first fraction, B.P. 145° C./0.3 mm. (155° C./0.2 mm.), contains 2'-hydroxy-4'-chlorobutyrophenone. The second fraction, B.P. 160–178° C./0.03 mm. (155–175° C./0.2 mm.), is quite pure 2'-chloro-4'-hydroxybutyrophenone. The yield is 138 g. of material which quickly solidifies upon cooling. Recrystallization of this material from cyclohexane (about two liters) gives a white crystalline product, M.P. 82.5–84° C. A second recrystallization gives little change in melting point.

Analysis.—$C_{10}H_{11}ClO_2$. Calculated: C, 60.46; H, 5.58; Cl, 17.85. Found: C, 60.15; H, 5.66; Cl, 17.77.

Step D: 2-methylene-2'-chloro-4'-hydroxybutyrophenone.—A 100 ml. round-bottom flask fitted with a condenser and calcium chloride drying tube is charged with 2'-chloro - 4' - hydroxybutyrophenone (36.6 g., 0.184 mole), dimethylamine hydrochloride (20 g., 0.245 mole), paraformaldehyde (7.2 g., 0.240 mole), concentrated hydrochloric acid (0.75 ml.) and absolute ethanol (30 ml.) and refluxed on a steam bath for 2.5 hours.

The reaction is cooled, treated with water (200 ml.) and extracted with ether (100 ml.). The aqueous phase is made basic with saturated sodium bicarbonate. On standing some oil separates. The reaction mixture is acidified with hydrochloric acid and extracted with ether. The aqueous phase is again made basic and allowed to stand overnight. The reaction mixture then is acidified and extracted with ether. The combined ether extracts are dried over sodium sulfate, and evaporated at reduced pressure. The residue is distilled to yield 21.7 g. (56%) of 2-methylene - 2' - chloro-4'-hydroxybutyrophenone, B.P. 165° C./0.02 mm.

Analysis.—$C_{11}H_{11}ClO_2$. Calculated: C, 62.71; H, 5.26. Found: C, 62.21; H, 5.20.

Step E: [3-chloro-4-(2-methylenebutyryl)phenoxy]-acetic acid.—A 50 ml. three-neck, round-bottom flask fitted with a water-cooled condenser, dropping funnel and magnetic stirrer is charged with 2'-chloro-4'-hydroxybutyrophenone (5.25 g., 0.025 mole) and a solution of sodium hydroxide (1.0 g., 0.025 mole) in water (10 ml.). The solution is stirred and heated on a steam bath and a solution of sodium chloroacetate (2.92 g., 0.025 mole) is added dropwise over a period of an hour. Then a solution of sodium chloroacetate (2.92 g., 0.025 mole) in water (10 ml.) and a solution of sodium hydroxide (1.0 g., 0.025 mole) in water are added simultaneously over a period of another hour. After stirring and heating for another two hours the reaction mixture is cooled to room temperature and acidified to a pH of 4 with concentrated hydrochloric acid. The product is extracted with 50 ml. of saturated aqueous sodium bicarbonate. The aqueous solution is acidified to a pH of 4 with dilute hydrochloric acid, extracted with 50 ml. of ether, dried over sodium sulfate and evaporated to dryness. The residue is recrystallized from a mixture of benzene and cyclohexane to give 3.0 g. of [3-chloro-4-(2-methylenebutyryl)phenoxy]acetic acid which melts at 109–110° C.

Analysis.—$C_{13}H_{13}ClO_4$. Calculated: C, 58.11; H, 4.88; Cl, 13.20. Found: C, 57.87; H, 5.05; Cl, 13.02.

Step F: [3-chloro-4-[2-(methyldithiomethyl)butyryl]-phenoxy]acetic acid.—By substituting [3-chloro-4-(2-methylenebutyryl)phenoxy]acetic acid and methyl hydrodisulfide for the [2,3-dichloro-4-(2-methylenebutyryl)phenoxy]acetic acid and benzyl hydrodisulfide of Example 1, Step G, and following substantially the procedure described therein, the product [3-chloro-4-[2-(methyldithiomethyl)butyryl]phenoxy]acetic acid is obtained.

EXAMPLE 4

[2,3-dichloro-4-[2-ethyl-3-(benzyldithio)butyryl] phenoxy]acetic acid

Step A: 2-ethyl - 2',3' - dichloro - 4' - hydroxybutyrophenone.—This product is prepared by substantially the same method as described in Example 1, Step B, using the following reagents:

| | | |
|---|---|---|
| 2,3-dichloroanisole (0.3 mole) | g | 53.11 |
| 2-ethylbutyryl chloride (0.6 mole) | g | 80.77 |
| Carbon disulfide | ml | 350.00 |
| Aluminum chloride (0.6 mole) | g | 80.00 |

Distillation of the residual oil gives 34.45 g. (44%) of product, B.P. 140–142° C./0.5 mm. After three recrystallizations from hexane, there is obtained white needles identified as 2-ethyl - 2',3' - dichloro-4'-hydroxybutyrophenone, M.P. 85–86° C.

Analysis.—$C_{12}H_{14}Cl_2O_2$. Calculated: C, 55.19; H, 5.40; Cl, 27.15. Found: C, 55.21; H, 5.64; Cl, 26.98.

Step B: 2-bromo-2-ethyl - 2',3' - dichloro-4'-hydroxybutyrophenone.—To a solution of 2-ethyl-2',3'-dichloro-4'-hydroxy-butyrophenone (522 mg., 0.002 mole) in glacial acetic acid (15 ml.) is added a solution of bromine (319 mg., 0.002 mole) in glacial acetic acid (5 ml.), dropwise, over a period of 15 minutes. The reactiton is initiated by adding a drop of 48% hydrobromic acid solution at the beginning of the addition period. Stirring is continued for an additional 15 minutes at room temperature.

The colorless reaction solution is poured into water (80 ml.) containing sodium bisulfite (80 mg.). The resulting white solid is collected, washed with water and dried. The yield is 643 mg. (95%) of product, M.P. 120.5–122.5° C. Recrystallization from a mixture of hexane and benzene gives prisms of 2-bromo-2-ethyl-2',3'-dichloro-4'-hydroxybutyrophenone, M.P. 122.5–123.5° C.

Analysis.—$C_{12}H_{13}BrCl_2O_2$. Calculated: C, 42.38; H, 3.85; Br, 23.50; Cl, 20.85. Found: C, 42.57; H, 3.92; Br, 23.38; Cl, 20.74.

Step C: 2-ethylidene - 2',3' - dichloro-4'-hydroxybutyrophenone.—A mixture of 2-bromo-2-ethyl-2',3'-dichloro-4'-hydroxybutyrophenone (430 mg., 0.00126 mole), lithium chloride (160 mg., 0.00378 mole) and dimethylformamide (3 ml.) is heated on a steam bath, with stirring, for 2.25 hours.

The cooled reaction solution is poured, with stirring, into water (45 ml.). The resulting white solid is collected, washed with water and dried. The yield is 308 mg. (94%), M.P. 117–119° C. Two recrystallizations from a mixture of hexane and benzene give prisms of 2-ethylidene-2',3'-dichloro-4'-hydroxybutyrophenone, M.P. 120–121° C.

Analysis.—$C_{12}H_{12}Cl_2O_2$. Calculated: C, 55.62; H, 4.67; Cl, 27.36. Found: C, 55.50; H, 4.71; Cl, 27.35.

Step D: Methyl [2,3-dichloro-4-(2-ethylidenebutyryl)phenoxy]acetate.—2 - ethylidene - 2′,3′ - dichloro-4′-hydroxybutyrophenone (20.73 g., 0.08 mole) is dissolved in absolute methanol (50 ml.) and treated with a solution of sodium (1.84 g., 0.08 mole) dissolved in absolute methanol (200 ml.). Methyl bromoacetate (13.5 g., 0.088 mole) is added and the resulting solution is stirred at room temperature for two hours and refluxed for 1.25 hours. The entire reaction is carried out in an atmosphere of dry nitrogen.

The volatile materials are removed by reduced pressure distillation. Fractional distillation of the residue yields methyl [2,3-dichloro - 4 - (2-ethylidenebutyryl)phenoxy]acetate.

Step E: [2,3-dichloro-4-(2-ethylidenebutyryl)phenoxy] acetic acid.—Methyl [2,3 - dichloro-4-(2-ethylidenebutyryl)phenoxy]acetate (3.45 g., 0.01 mole) is dissolved in ethanol (100 ml.) and treated with a solution of sodium bicarbonate (1.68 g., 0.02 mole) in water (200 ml.). The solution which results upon warming is heated on a steam bath with stirring for two hours. The reaction solution is then concentrated under reduced pressure to a volume of 75 ml. and the cooled residue is extracted with ether to remove any unreacted methyl [2,3-dichloro-4-(2-ethylidenebutyryl)phenoxy]acetate. The aqueous solution is made acid to Congo red paper by the addition of 6 N hydrochloric acid to give a solid product.

Recrystallization of the product from a mixture of benzene and cyclohexane yields [2,3-dichloro - 4 - (2-ethylidenebutyryl)phenoxy]acetic acid in the form of white needles, M.P. 124.5–125.5° C.

Analysis.—$C_{14}H_{14}Cl_2O_4$. Calculated: C, 53.02; H, 4.45; Cl, 22.36. Found: C, 53.28; H, 4.43; Cl, 22.34.

Step F: [2,3-dichloro-4-[2-ethyl-3-(benzyldithio)butyryl]phenoxy]acetic acid.—By substituting [2,3-dichloro-4-(2-ethylidenebutyryl)phenoxy]acetic acid for the [2,3-dichloro - 4 - (2-methylenebutyryl)phenoxy]acetic acid of Example 1, Step G, and following substantially the procedure described therein, the product [2,3-dichloro-4-[2-ethyl-3-(benzyldithio)butyryl]phenoxy]acetic acid is obtained.

EXAMPLE 5

2,3-dichloro-4-[2-(methyltrithiomethyl)butyryl]phenoxy]acetic acid

By substituting methyl hydrotrisulfide for the benzyl hydrodisulfide reactant of Example 1, Step G, and following substantially the procedure described therein, the procedure [2,3 - dichloro-4-[2-methyltrithiomethyl)butyryl]phenoxy]acetic acid is obtained.

In a manner similar to that described in Example 5 the product [2,3-dichloro-4-[2-(methyldithiomethyl)butyryl]phenoxy]acetic acid is obtained by substituting methyl hydrodisulfide for thet methyl hydrotrisulfide reactant of that example and following substantially the procedure described therein.

EXAMPLE 6

[4-[2-(benzyldithiomethyl)propionyl]phenoxy]acetic acid

Step A: (4-isobutyrylphenoxy)acetic acid.—Powdered aluminum chloride (160 g., 1.2 mole) and carbon disulfide (200 ml.) are placed in a one-liter, four-neck flask equipped with a stirrer, dropping funnel, reflux condenser and internal thermometer. Phenoxyacetic acid (61 g., 0.4 mole) is added in portions with stirring and then isobutyryl chloride (53.5 g., 0.5 mole) is added dropwise with stirring over a period of 0.5 hour at a temperature of about 22–26° C. After stirring one hour at room temperature, the reaction flask was placed in a water bath and the temperature maintained at 50° C. for three hours. The carbon disulfide then is decanted off and the aluminum complex remaining is added to a mixture of 500 g. of ice and 125 ml. of concentrated hydrochloric acid. The yellow oil that forms is separated giving 51.6 g. of (4-isobutyrylphenoxy) acetic acid, B.P. 185–190° C. (1 mm. pressure).

Step B: [4-(2-bromoisobutyryl)phenoxy]acetic acid.— (4-isobutyrylphenoxy)acetic acid (35.6 g., 0.16 mole) is added to 125 ml. of glacial acetic acid at room temperature. Bromine (25.7 g., 0.16 mole) in 30 ml. of glacial acetic acid is added dropwise to the reaction mixture at 25° C. with stirring during a period of one hour. Stirring is continued an additional hour and then the mixture is added to a mixture of 300 g. of ice and 500 ml. of water. The solid which separates is collected on the filter, washed and recrystallized from benzene to give 33 g. of [4-(2-bromoisobutyryl)phenoxy]acetic acid, M.P. 144–145° C.

Analysis.—$C_{12}H_{13}BrO_4$. Calculated: Br, 26.54. Found: Br, 26.57.

Step C: (4-methacrylylphenoxy)acetic acid.—[4-(2-bromoisobutyryl)phenoxy]acetic acid (12 g., 0.04 mole), is dissolved in benzene (800 ml.) and silver acetate (15 g., 0.09 mole) is added. The mixture is stirred and refluxed for four hours and then cooled. Water (150 ml.) and 15 ml. of concentrated hydrochloric acid is added whereupon the silver salts precipitate and are removed by filtration. The benzene then is evaporated to a small volume, diluted with hexane, and the solid that separates is crystallized from benzene to give (4-methacrylylphenoxy)acetic acid, M.P. 124.5–126.5° C., yield 4.1 g.

Analysis.—$C_{12}H_{12}O_4$. Calculated: C, 65.45; H, 5.49; Neut. Eq., 220.2. Found: C, 65.65; H, 5.59; Neut. Eq., 221.7.

Step D: [4 - [2 - benzyldithiomethyl)propionyl]phenoxy]acetic acid.—By substituting (4-methacrylylphenoxy)acetic acid for the [2,3-dichloro-4-(2-methylenebutyryl)phenoxy]acetic acid of Example 1, Step G, and following substantially the procedure described therein the product [4 - [2-(benzyldithiomethyl)propionyl]phenoxy] acetic acid is obtained.

EXAMPLE 7

[3-chloro-4-[2-(benzyldithiomethyl)propionyl]phenoxy] acetic acid

Step A: (3-chloro-4-propionylphenoxy)acetic acid.— The above product is prepared following substantially the same method described in Example 6, Step A, using the following reagents:

Propionyl chloride (0.625 mole) _____g__ 57.8
(3-chlorophenoxy)acetic acid (0.5 mole) _____g__ 93.29
Powdered aluminum chloride (1.625 mole) __g__ 216
Carbon disulfide _____ml__ 400

There is thus obtained 77 g. of (3-chloro-4-propionylphenoxy)acetic acid, M.P. 108–109.5° C. (corr.).

Analysis.—$C_{11}H_{11}ClO_4$. Calculated: C, 54.44; H, 4.57; Cl, 14.61. Found: C, 54.88; H, 4.46; Cl, 14.36.

Step B: [3-chloro-4-(2-dimethylaminomethylpropionyl) phenoxy]acetic acid hydrochloride.—In a 100 ml. round flask equipped with an outlet tube suitable for application of intermittent suction, an intimate mixture of (3 - chloro - 4 - propionylphenoxy)acetic acid (14.52 g., 0.06 mole), paraformaldehyde (2.1 g., 0.072 mole), dry dimethylamine hydrochloride (5.34 g., 0.066 mole) and acetic acid (4 drops) is heated on the steam bath for about 1.5 hours during which period suction is applied for about one-minute intervals five or six times. Upon cooling, a solid (19 g.) is obtained which, after triturating with ether, melts at 147–149° C. Upon recrystallization from methanol there is obtained [3-chloro-4-(2-dimethylaminomethylpropionyl)phenoxy]acetic acid hydrochloride, M.P. 158–160° C.

Analysis.—$C_{14}H_{18}ClNO_4 \cdot HCl$. Calculated: C, 50.09; H, 5.69; N, 4.16. Found: C, 49.98; H, 5.71; N, 4.10.

Step C: (3-chloro-4-methacrylylphenoxy)acetic acid.— [3 - chloro - [4-(2-dimethylaminomethyl)propionyl]phenoxy]acetic acid hydrochloride (1 g., 0.003 mole) is dissolved in 25 ml. of water and the solution made slightly basic by the addition of 10% sodium bicarbonate solution. The resulting solution is heated for 25 minutes on a steam bath, cooled and acidified with 6 N hydrochloric acid to give 0.7 g. of solid (3-chloro-4-methacrylylphenoxy)acetic acid, M.P. 125–127° C. After recrystallization from benzene the product melts at 127–128° C., yield 0.5 g. (66%).

Step D: [3 - chloro-[4-(2-benzyldithiomethyl)propionyl]phenoxy]acetic acid.—By substituting (3 - chloro - 4 - methacrylylphenoxy)acetic acid for the [2,3-dichloro-4-2-methylenebutyryl)phenoxy]acetic acid of Example 1, Step G, and following substantially the procedure described therein, the product [3-chloro-[4-(2-benzyldithiomethyl)propionyl]phenoxy]acetic acid is obtained.

EXAMPLE 8

[3-[2-(ethyldithiomethyl)propionyl]phenoxy]acetic acid

Step A: (3-propionylphenoxy)acetic acid.—A solution of 0.1 mole of 3-propionylphenol in 60 cc. of ethylene glycol dimethyl ether is added to a suspension of 0.1 mole of sodium hydride in 40 cc. of the same solvent. Then 0.11 mole of ethyl bromoacetate is added during 25 minutes. The mixture is refluxed one hour and the precipitated sodium bromide is filtered off and solvent distilled in vacuo. To the residue is added 80 cc. of 10% sodium hydroxide solution and the mixture heated on the steam bath for 10 minutes until a clear solution is formed. The solution is acidified to precipitate the product which soon crystallizes. Recrystallization from a mixture of benzene and cyclohexane gives (3-propionylphenoxy)acetic acid, M.P. 72–78° C.

Step B: [3-[-(dimethylaminomethyl)propionyl]-phenoxy]acetic acid hydrochloride.—A mixture of (3-propionylphenoxy)acetic acid (17.0 g., 0.082 mole), paraformaldehyde (3.2 g., 0.105 mole), dimethylamine hydrochloride (7.4 g., 0.9 mole) and 0.8 cc. of acetic acid is heated 1.7 hours on the steam bath. The crystalline mass thus obtained is triturated with 120 cc. boiling isopropyl alcohol. The insoluble [3-[2-(dimethylaminomethyl)propionyl]phenoxy]acetic acid hydrochloride weighs 18.0 g., M.P. 148–151° C.

Step C: (3-methacrylylphenoxy)acetic acid.—A solution of [3 - [2 - (dimethylaminomethyl)propionyl] - phenoxy] acetic acid hydrochloride (14 g.), in 120 cc. of saturated sodium bicarbonate solution is heated three minutes on the steam bath. Acidification with hydrochloric acid precipitates the crystalline unsaturated ketone which, after recrystallization from a mixture of benzene and cyclohexane, gives 2.8 g. of (3-methacrylylphenoxy)acetic acid, M.P. 69–71° C.

Analysis.—$C_{12}H_{12}O_4$. Calculated: C, 65.44; H, 5.49. Found: C, 65.43; H, 5.79.

Step D: [3 - [2 - (ethyldithiomethyl)propionyl]phenoxy]-acetic acid.—By substituting (3 - methacrylylphenoxy)acetic acid and ethyl hydrodisulfide for the [2,3-dichloro-4-(2-methylenebutyryl)phenoxy]acetic acid and benzyl hydrodisulfide, respectively, of Example I, Step G, and following substantially the procedure described therein the product [3 - [2 - (ethyldithiomethyl)propionyl)phenoxy]acetic acid is obtained.

EXAMPLE 9

[3,5-dimethyl-2-[2-benzyldithiomethyl)butyryl] phenoxy]acetic acid

Step A: 2-butyryl-3,5-dimethylphenol.—To a solution of 0.15 mole of 3,5-dimethylphenol in 60 cc. of pyridine is added, during 15 minutes while cooling in an ice bath, 0.18 mole of butyryl chloride. The mixture is permitted to stand one hour at room temperature and then is diluted with 300 cc. of water to give an oily product which is taken up in ether. The ether solution is washed thoroughly with dilute acid and water, dried and the ether evaporated to leave the butyric acid ester of 3,5-dimethylphenol. The ester is mixed with 0.29 mole of aluminum chloride and then heated 1.6 hours on the steam bath. The reaction mixture is poured onto ice and the solid product obtained is recrystallized from cyclohexane to give 2-butyryl-3,5-dimethylphenol, M.P. 57–58° C.

Analysis.—$C_{12}H_{16}O_2$. Calculated: C, 74.97; H, 8.39. Found: C, 74.63; H, 8.35.

Step B: (2 - butyryl - 3,5 - dimethylphenoxy)acetic acid.—By substituting 2äbutyryl-3,5-dimethylphenol for the 3-propionylphenol of Example 8, Step A, and following substantially the procedure described therein, the compound (2-butyryl-3,5-dimethylphenoxy)acetic acid is obtained which, after recrystallization from aqueous acetic acid, melts at 108–109° C.

Step C: [2 - [2 - (dimethylaminomethyl)butyryl]-3,5-dimethylphenoxy]acetic acid hydrochloride.—By substituting (2-butyryl - 3,5 - dimethylphenoxy)acetic acid for the (3 - chloro - 4 - propionylphenoxy)acetic acid of Example 7, Step B, and following substantially the procedure described therein the compound [2 - [2 - (dimethylaminomethyl)butyryl]phenoxy]acetic acid hydrochloride is obtained having a melting point of 165–167° C.

Step D: [2 - (2 - methylenebutyryl) - 3,5 - dimethylphenoxy]acetic acid.—This product is obtained by treating the [2 - [2 - (dimethylaminomethyl)butyryl]-3,5-dimethylphenoxy]acetic acid hydrochloride of Step C with sodium bicarbonate solution by substantially the same procedure described in Example 7, Step C, to give [2-(2-methylenebutyryl) - 3,5 - dimethylphenoxy]acetic acid which, after recrystallization from aqueous acetic acid, melts at 109.5–111.0° C.

Analysis.—$C_{15}H_{18}O_4$. Calculated: C, 68.68; H, 6.92. Found: C, 68.68; H, 7.04.

Step E: [2 - [2 - (benzyldithiomethyl)butyryl]-3,5-dimethylphenoxy]acetic acid.—By substituting [2-(2-methylenebutyryl)-3,5-dimethylphenoxy]acetic acid for the [2,3 - dichloro - 4 - (2 - methylenebutyryl)phenoxy]acetic acid of Example 1, Step G, and following substantially the procedure described therein, the product [2-[2-benzyldithiomethyl)butyryl] - 3,5 - dimethylphenoxy]acetic acid is obtained.

EXAMPLE 10

Methyl[2,3-dichloro-[4-(2-benzyldithiomethyl)butyryl]phenoxy]acetate

Step A: Methyl[2,3 - dichloro - [4 - (2 - methylenebutyryl)phenoxy]acetate.—2,3-dichloro - 4 - (2 - methylenebutyryl)phenol (19.6 g., 0.08 mole) (Example 1, Step D) is dissolved in absolute methanol (50 ml.) and treated with a solution of sodium (1.84 g., 0.08 mole) dissolved in absolute methanol (200 ml.). Methyl bromoacetate (13.5 g., 00.88 mole) is added and the resulting solution is stirred at room temperature for two hours and refluxed for 1.25 hours. The entire reaction is carried out in an atmosphere of dry nitrogen.

The volatile materials are removed by reduced pressure distillation. Fractional distillation of the residue gives methyl [2,3 - dichloro - 4 - (2 - methylenebutyryl)phenoxy]acetate, B.P. 173–175° C./0.2 mm.

Analysis.—$C_{14}H_{14}Cl_2O_4$. Calculated: C, 53.02; H, 4.45; Cl, 22.36. Found: C, 52.81; H, 4.56; Cl, 22.15.

Step B: Methyl[2,3 - dichloro - [4 - (2 - benzyldithiomethyl)butyryl]phenoxy]acetate.—By substituting methyl [2,3 - dichloro - 4 - (2 - methylenebutyryl)phenoxy]acetate for the [2,3 - dichloro - 4 - (2 - methylenebutyryl)phenoxy]acetic acid of Example 2, Step D, and following substantially the procedure described therein, the product methyl [2,3-dichloro - [4 - (2 - benzyldithiomethyl)butyryl]phenoxy]acetate is obtained.

In a manner similar to that described in Example 7, supra, other products of the invention may be obtained. Hence, by substituting the appropriate alkanoic acid halide and the appropriate phenoxy- or phenylthioalkanoic acid and secondary amine hydrochloride and hydrodisulfide reactants for the propionyl chloride, (3-chlorophenoxy) acetic acid, dimethylamine hydrochloride and benzyl hydrodisulfide of Example 7, and following substantially the procedure described in Steps A through D of that example, the [4 - [2 - (hydrocarbyldithiomethyl) - alkanoyl] phenoxy]- and [4 - [2 - hydrocarbyldithiomethyl) - alkanoyl]phenylthio]alkanoic acids (I) of the invention may be prepared. The following equation, wherein $w$ represents an integer having a value greater than one, illustrates the reaction of Example 7, Steps A through D, and together with Table I, depicts the reactants and [4-[2-(hydrocarbyldithiomethyl)alkanoyl]phenoxy] - and [4 - [2-hydrocarbyldithiomthyl) alkanoyl] phenylthio] alkanoic acid products (I) produced thereby:

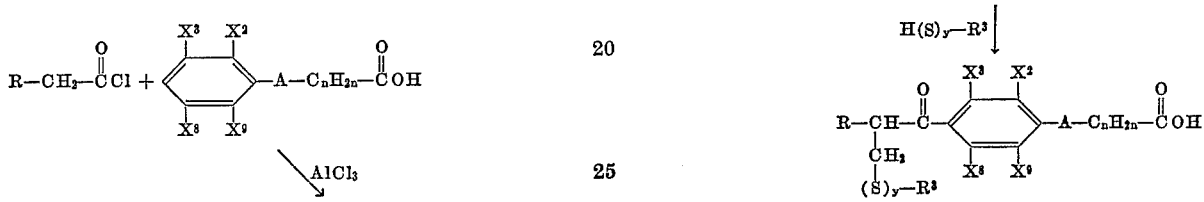

TABLE I

| Ex. | R | R³ | R⁴ | R⁵ |
|---|---|---|---|---|
| 11 | —CH₃ | —C₂H₅ | —CH₂—(CH₂)—CH₂—CH₂— | |
| 12 | —C₂H₅ | —CH₂—⟨phenyl⟩ | —CH₃ | —CH₃ |
| 13 | —C₂H₅ | —C₂H₅ | —CH₃ | —CH₃ |
| 14 | —C₂H₅ | —CH₂—⟨phenyl⟩ | —CH₃ | —CH₃ |
| 15 | —CH₂—CF₃ | —CH₃ | —CH₃ | —CH₃ |
| 16 | ⟨thiophene⟩ | —C₂H₅ | —CH₃ | —CH₃ |
| 17 | —C₂H₅ | —CH—(⟨phenyl⟩)₂ | —CH₃ | —CH₃ |
| 18 | ⟨phenyl⟩ | —CH₃ | —CH₂—(CH₂)—CH₂—CH₂— | |
| 19 | ⟨thiopyran⟩ | —CH₂—⟨phenyl⟩ | —CH₃ | —CH₃ |
| 20 | —C₂H₅ | —CH₃ | —CH₃ | —CH₃ |
| 21 | —C₂H₅ | —CH₃ | —CH₃ | —CH₃ |
| 22 | —CH(CH₃)(CF₃) | —CH₃ | —CH₃ | —CH₃ |
| 23 | —C₂H₅ | —CH—(⟨phenyl⟩)₂ | —CH₃ | —CH₃ |
| 24 | —C₂H₅ | —CH₃ | —CH₃ | —CH₃ |
| 25 | —C₂H₅ | —CH₃ | —CH₃ | —CH₃ |
| 26 | —C₂H₅ | —CH₃ | —CH₃ | —CH₃ |
| 27 | —C₂H₅ | —CH₃ | —CH₃ | —CH₃ |
| 28 | —CH(CH₃)₂ | —C₂H₅ | —CH₃ | —CH₃ |
| 29 | —C₂H₅ | —CH₂—⟨phenyl⟩ | —CH₃ | —CH₃ |
| 30 | —C₂H₅ | —C₂H₅ | —CH₃ | —CH₃ |
| 31 | —C₂H₅ | —C₂H₅ | —CH₃ | —CH₃ |
| 32 | —C₂H₅ | —CH₃ | —CH₃ | —CH₃ |
| 33 | —C₂H₅ | —CH—⟨phenyl⟩ | —CH₃ | —CH₃ |
| 34 | —C₂H₅ | —CH₃ | —CH₃ | —CH₃ |

TABLE I—Continued

| Ex. | X³ | X³ | X⁸ | X⁹ | A | —$C_uH_{2u}$— | Y |
|---|---|---|---|---|---|---|---|
| 11 | H | Cl | H | H | S | —$CH_2$—$CH_2$— | 3 |
| 12 | —CH=CH—CH=CH— | | H | H | O | —$CH_2$— | 2 |
| 13 | Cl | Cl | H | H | O | —$CH_2$— | 2 |
| 14 | —$CH_3$ | —$CH_3$ | H | H | O | —$CH_2$— | 2 |
| 15 | —$CH_3$ | —$CH_3$ | H | H | O | —$CH_2$— | 2 |
| 16 | H | Cl | H | H | O | —$CH_2$— | 3 |
| 17 | Cl | Cl | H | H | O | —$CH_2$— | 2 |
| 18 | H | Cl | H | H | O | —$CH_2$— | 2 |
| 19 | Cl | C. | H | H | O | —$CH_2$— | 2 |
| 20 | Cl | Cl | H | H | O | —$CH_2$— | 3 |
| 21 | —$CH_3$ | —$CH_3$ | H | H | O | —$CH_2$— | 2 |
| 22 | H | —$CH_3$ | H | H | O | —$CH_2$— | 3 |
| 23 | —$CH_3$ | —$CH_3$ | H | H | O | —$CH_2$— | 2 |
| 24 | H | Cl | Cl | H | O | —$CH_2$— | 2 |
| 25 | —$CH_3$ | —$CH_3$ | H | H | O | —$CH_2$— | 3 |
| 26 | —$CH_3$ | —$CH_3$ | —$CH_3$ | —$CH_3$ | O | —$CH_2$— | 3 |
| 27 | —CH=CH—CH=CH— | | H | H | O | —$CH_2$— | 2 |
| 28 | H | Cl | H | H | O | —$CH_2$— | 3 |
| 29 | —CH=CH—CH=CH— | | H | H | O | —$CH_2$— | 2 |
| 30 | H | Cl | H | H | O | —$CH_2$— | 2 |
| 31 | H | Cl | H | H | O | —$CH_2$— | 3 |
| 32 | —$CH_2$—$CH_2$—$CH_2$—$CH_2$— | | H | H | O | —$CH_2$— | 2 |
| 33 | —$CH_3$ | —Cl | H | H | O | —$CH_2$— | 3 |
| 34 | Cl | —$CH_3$ | H | H | O | —$CH_2$— | 2 |

It will be apparent from the foregoing description that the [[4 - (2 - hydrocarbyldithiomethyl)alkanoyl] - phenoxy] - and [[4 - (2 - hydrocarbyldithiomethyl)alkanoyl]-phenylthio]alkanoic acids (I) of this invention constitute a valuable class of compounds which have not been prepared heretofore. One skilled in the art will also appreciate that the processes disclosed in the above examples are merely illustrative and are capable of wide variation and modification without departing from the spirit of the invention.

What is claimed is:

1. A member selected from the group consisting of a compound of the formula:

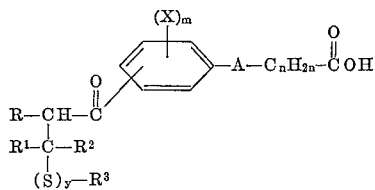

wherein A is a member selected from the group consisting of oxygen and sulfur; R is a member selected from the group consisting of hydrogen, lower alkyl, haloalkyl, cycloalkyl and mononuclear aryl; $R^1$ and $R^2$ represent similar or dissimilar substituents selected from the group consisting of hydrogen and lower alkyl; $R^3$ is a member selected from the group consisting of lower alkyl, mononuclear aryl and mononuclear aralkyl; y is an integer having a value of 2-3; the X radicals represent similar or dissimilar substituents selected from the group consisting of hydrogen, halogen, trifluoromethyl, lower alkyl, lower alkoxy and, when substituted on adjacent carbon atoms of the benzene ring, two X radicals may be joined together to form an hydrocarbylene chain containing four carbon atoms between its points of attachment; m is an integer having a value of 1–4 and n is an integer having a value of 1–5; and the nontoxic, pharmacologically acceptable, acid addition salts, esters and amides thereof.

2. A compound of the formula:

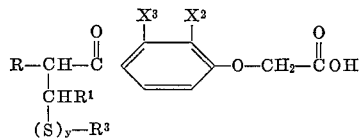

wherein R is lower alkyl; $R^1$ is a member selected from the group consisting of hydrogen and methyl; $R^3$ is a member selected from the group consisting of lower alkyl, phenyl, and benzyl; $X^2$ and $X^3$ represent similar or dissimilar substituents selected from the group consisting of hydrogen, halogen, lower alkyl and, taken together, the $X^2$ and $X^3$ radicals may be joined to form a 1,3-butadienylene chain and y is an integer having a value of 2–3.

3. [2,3-dihalo - 4-[2-(benzyldithiomethyl)-lower alkanoyl]phenoxy]acetic acid.

4. [2,3-di-lower alkyl - 4-[2-(benzyldithiomethyl)-lower alkanoyl]phenoxy]acetic acid.

5. A compound of the formula:

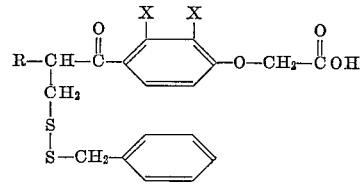

wherein R is lower alkyl; one X is halogen and the remaining X is lower alkyl.

6. A compound of the formula:

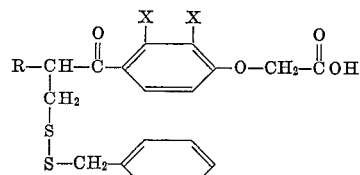

wherein R is lower alkyl, one X is halogen and the remaining X is hydrogen.

7. [4-[2-(benzyldithiomethyl) lower alkanoyl]-1-naphthyloxy]acetic acid.

8. [2,3-dihalo - 4-[2-(alkyldithiomethyl) lower alkanoyl]-phenoxy]acetic acid.

9. [2,3-di-lower alkyl - 4-[2-(alkyldithiomethyl) lower alkanoyl]phenoxy]acetic acid.

10. A compound of the formula:

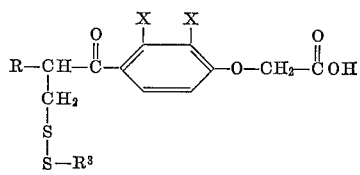

wherein R is lower alkyl; $R^3$ is lower alkyl; one X is halogen and the remaining X is lower alkyl.

11. A compound of the formula:

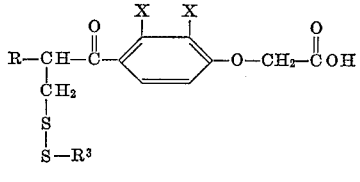

wherein R is lower alkyl; R³ is lower alkyl; one X is halogen and the remaining X is hydrogen.

12. [4-[2-(alkyldithiomethyl) lower alkanoyl]-1-naphthyloxy]acetic acid.

13. [2,3-dihalo-4-[2-(lower alkyldithiomethyl) lower alkanoyl]phenoxy]acetic acid.

14. [2,3-dichloro - 4-[2-(benzyldithiomethyl)-butyryl] phenoxy]acetic acid.

15. [2,3-dichloro - 4-[2-(benzyltrithiomethyl)-butyryl] phenoxy]acetic acid.

16. [2,3-dichloro - 4-[2-(methyldithiomethyl)-butyryl] phenoxy]acetic acid.

17. [4-[2-benzyldithiomethyl)butyryl]-1-naphthyloxy] acetic acid.

18. [2,3-dimethyl - 4-2-(benzyldithiomethyl) - butyryl phenoxy] acetic acid.

References Cited

UNITED STATES PATENTS 3,213,076  10/1965  Brudde _____ 260—516 X
3,281,455  10/1966  Steinberg _____ 260—370 X

FOREIGN PATENTS 680,744  2/1964  Canada.

LORRAINE A. WEINBERGER, Primary Examiner

M. G. BERGER, Assistant Examiner

U.S. Cl. X.R.

260—247.7, 293.4, 294.7, 326.5, 465, 470, 471, 473, 501.16, 501.21, 519, 520, 521, 558, 559, 570.5, 592, 612, 613; 424—308, 316, 317, 324